United States Patent [19]

Fahey et al.

[11] 4,078,227

[45] Mar. 7, 1978

[54] THRESHOLD DETECTOR FOR OPTICAL CHARACTER RECOGNITION SYSTEM

[75] Inventors: William David Fahey, Cupertino; Paul J. Perez, Sunnyvale, both of Calif.

[73] Assignee: The Singer Company, Binghamton, N.Y.

[21] Appl. No.: 779,702

[22] Filed: Mar. 21, 1977

[51] Int. Cl.² .............................................. G06K 9/00
[52] U.S. Cl. .......................... 340/146.3 AG; 328/151
[58] Field of Search ............. 340/146.3 AG; 358/161, 358/163, 166, 167–169; 328/135, 150, 151; 307/350, 351, 358

[56] References Cited

U.S. PATENT DOCUMENTS

| | | | |
|---|---|---|---|
| 3,159,815 | 12/1964 | Groce | 340/146.3 AG |
| 3,225,213 | 12/1965 | Hinrichs et al. | 340/146.3 AG |
| 3,599,151 | 8/1971 | Harr | 340/146.3 AG |
| 3,675,201 | 7/1972 | McKissick et al. | 340/146.3 AG |
| 3,869,698 | 3/1975 | Trost et al. | 340/146.3 AG |
| 3,909,594 | 9/1975 | Allais et al. | 340/146.3 AG |

*Primary Examiner*—Leo H. Boudreau
*Attorney, Agent, or Firm*—Boone, Schatzel, Hamrick & Knudsen

[57] ABSTRACT

A threshold detector for use with a video signal including a first level representative of a white surface, a second level representative of a true black mark on the white surface, and a third level intermediate the first and second levels representative of a false black mark, the threshold detector comprising a DC restoring circuit for clamping the video signal such that the first level is clamped to a base level, a peak detector circuit responsive to the restored signal and operative to provide a peak detected signal having a magnitude that corresponds generally to the peaks of the restored second level, a voltage divider circuit for reducing the magnitude of the peak detected signal by a predetermined amount, a comparator responsive to the restored signal and the reduced peak detected signal and operative to produce a first bistate signal having a high level when the restored signal exceeds the reduced peak detected signal, a pulse generator for generating a sequence of pulses, one of which occurs when the first bistate signal has a high level, and a flip-flop responsive to the first bistate signal and the sequence of pulses and operative to provide a second bistate signal having a first state and a second state, and having a transition from the first state to the second state when there is time coincidence between the high level and one of the pulses, the second state corresponding to the occurrence of a true black mark.

8 Claims, 2 Drawing Figures

THRESHOLD DETECTOR FOR OPTICAL CHARACTER RECOGNITION SYSTEM

BACKGROUND OF THE INVENTION

1. Field of the Invention

The present invention relates generally to the field of processing information contained on coded tags, and more particularly, to a threshold detector for use in an optical character recognition system.

2. Description of the Prior Art

In many enterprises, such as grocery stores, post offices, parts supply warehouses, etc., large numbers of items must be handled during a specified time period. For example, a clerk at a check out counter in a grocery store must properly handle each item that is purchased so that the customer is correctly billed and/or the item is correctly inventoried. In the past such handling has been accomplished by manually ringing up the required amount on a cash register. However, recently with the advent of point-of-sale systems, this handling is able to be done automatically with the use of coded tags, labels or the like, that are fastened to the items and read by an appropriate reader device. A conventional tag comprises a front surface having black characters, such as letters, numbers, marks, etc., on a white background.

One type of prior art device for sensing the characters employs a fixed threshold detector circuit. The device serves to provide an appropriate signal when the blackness associated with the character exceeds a reference level. However, such a device has been found to be undesirable since variations in the parameters affecting the threshold level must be either tolerated or be capable of normalization by adjusting one or more of its components. For example, adjustment is typically required of the gain of a linear amplifier, the intensity of a light source or of a plurality of individual light sources, the ambient temperature, etc. The drawbacks of the described approaches reside not only in the individual adjustments which must be made, but in the fact that subsequent readjustments are periodically required to accommodate degradation of the light source and/or the photo sensing device and its associated circuit components. In addition, since ambient conditions such as dust and other airborne deposits tend to compromise the associated optical system, and consequently the signal strength provided by the photo sensing device, regular maintenance of the device is required.

Furthermore, it should be noted that one of the practical difficulties in systems that serve to optically scan tags having characters or marks on them is the fact that the density, opacity, blackness or readability of the characters is extremely variable due to the wide fluctuations in the quality of the printing ink used. This causes variations in the signal level of an analog video signal corresponding in part to the black character. Moreover, due to a varying reflectivity characteristic of the white surface being scanned, the degradation with age of the light source, and the varying characteristics of the photo sensors, the "white" level of the video signal is subject to simultaneous variation. Because of the simultaneous variations in the black and white levels, fixed threshold detector circuits are subject to errors in recognizing characters.

Another type of device for sensing optical marks is found in U.S. Pat. No. 3,560,751, entitled, "Optical Mark Sensing Device," by Donald L. Buettner et al. The patent teaches a complex device that includes a capacitive means for storing a voltage level representative of background illumination and that emits a signal upon the occurrence of a proportional reduction of light level indicative of a mark in the sensing area.

Yet another type of prior art device is found in U.S. Pat. No. 3,820,068, entitled, "Background Reference Level System and Method for Document Scanners," by John V. McMillin. The disclosed system is adapted to check marks in a multiplicity of data channels and consequently includes a relatively complex analog-to-digital converter.

SUMMARY OF THE PRESENT INVENTION

It is therefore an object of the present invention to provide a simple, reliable threshold detector which is able to respond to a video signal representative of black marks on a generally white background surface that is being scanned and to provide a bistate output signal indicative of each occurrence of a mark.

Another object of the present invention is to provide a threshold detector which provides an indication of black marks on a generally white surface and which is not subject to errors due to variations in the reflectivity of the white surface or due to degradation of the light source and light detectors used to develop the video signal.

Still another object of the present invention is to provide a threshold detector for use in an optical character recognition system which is capable of normalizing variations in contrast between the background whiteness of the tag and black marks on the tag.

Briefly, the preferred embodiment comprises a clamping circuit responsive to a video signal having a first level representative of a white surface, a second level representative of a true black mark on the white surface, and a third level intermediate the first and second levels representative of a false black mark, the clamping circuit being operative to clamp the video signal so as to provide a restored signal that is a replica of the video signal and that has a base level corresponding to the first level, a fourth level corresponding to the second level and a fifth level corresponding to the third level, a peak detector circuit responsive to the restored signal and operative to provide a peak detected signal having a magnitude that corresponds generally to the fourth level, a voltage divider for reducing the magnitude of the peak detected signal such that the reduced signal exceeds the fifth level, a comparator responsive to the restored signal and the reduced peak detected signal and operative to produce a first bistate signal having a normally low level and having a high level when the restored signal exceeds the reduced peak detected signal, a pulse generator for generating a sequence of pulses, one of which occurs when the first bistate signal has a high level, and a flip-flop responsive to the first bistate signal and the sequence of pulses and operative to provide a second bistate signal having a first state and a second state, and having a transition from the first state to the second state when there is time coincidence between the high level and one of the pulses, the second state corresponding to the occurrence of a true black mark.

An advantage of the present invention is that it provides a simple, reliable threshold detector which is able to accurately respond to a video signal representative of black marks on a generally white background surface that is being scanned by developing a bistate output signal indicative of each occurrence of a mark.

Another advantage of the present invention is that it is not subject to errors over a wide range of variations in the reflectivity of the white surface or due to degradation of the light source and light detectors used to develop the video signal.

Still another advantage of the present invention is that it is capable of normalizing variations in contrast between the background whiteness of the tag and black marks on the tag.

Other objects and advantages of the present invention will no doubt become apparent to those skilled in the art after having read the following detailed description of the preferred embodiment which is illustrated in the several figures of the drawing.

IN THE DRAWING

FIG. 1 is a schematic diagram of a threshold detector in accordance with the present invention; and FIG. 2 is a timing diagram for the threshold detector illustrated in FIG. 1.

DETAILED DESCRIPTION OF THE PREFERRED EMBODIMENT

Figure 1:
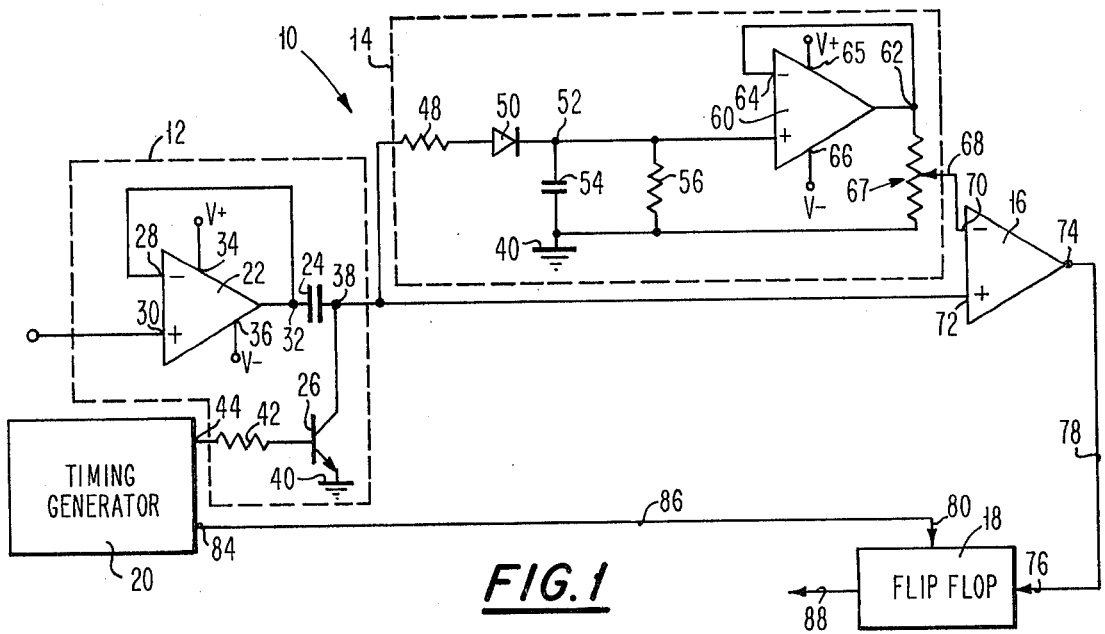

Referring to FIG. 1 of the drawing, a threshold detector circuit 10 is shown in block diagram form in accordance with the present invention. The circuit 10 comprises a DC restoring circuit 12, a peak detector circuit 14, a comparator 16, a flip-flop 18 and a timing generator 20.

The DC restoring circuit or clamping circuit 12 includes an operational amplifier 22, a coupling capacitor 24 and a clamping transistor 26.

The amplifier 22 has an inverting input 28, a non-inverting input 30 and an output 32. A positive source of potential is applied at 34 and a negative source of potential is applied at 36. The output 32 is coupled to the inverting input 28. The amplifier 22 has a high input impedance and serves to conduct a video input signal present at the input terminal 30 to the output 32 while isolating the output stage of devices (not shown) that are connected to the input terminal 30 from impedance variations of the threshold detector 10. Typically, such devices may be charge injected devices (CID) arranged in a scanning array or the like which are configured to develop the analog video input signal which is applied to the input. In the preferred embodiment, the amplifier is one manufactured by the Harris Corporation and designated by them as the model HA-2655.

The coupling capacitor 24 has one plate connected to the output 32 and an opposed plate connected to a node 38. The capacitor 24 charges to a potential corresponding to the difference between the level of the amplified video signal and a base level and serves to remove the DC component from the amplified video signal.

The clamping transistor 26 is an NPN transistor having its collector connected to the node 38, its emitter connected to ground 40 and its base connected through a current limiting resistor 42 to an output 44 of the timing generator 20. The transistor 26 is normally turned off. In response to a positive level applied to its base, which in turn forward biases the base-to-emitter junction, the transistor 26 turns on. This causes the potential at node 38 to be grounded, or clamped to a zero volt DC level. When the positive level is applied, the voltage from the amplified video signal is established across the capacitor 24. When the positive level is removed, the voltage established across the capacitor 24 provides a DC restored video signal at node 38.

The peak detector circuit 14 includes a resistor 48 having a terminal connected to the node 38 and having an opposed terminal connected to the anode of a diode 50. The cathode of the diode 50 is connected to a node 52. The diode 50 serves to allow only positive potentials to reach the node 52 and to prevent the capacitor 54 from discharging. A load impedance comprising a capacitor 54 connected in parallel with a resistor 56 is connected between the node 52 and ground 40. The resistor 48 and capacitor 54 serve to limit the response of the circuit 14 and hence, provide a path to ground for high frequency signals. This prevents high voltage signals, corresponding to very black video signals, having a short duration from overloading the peak detector circuit 14. The resistor 56 provides a discharge path for the potential developed at node 52.

When a DC restored signal appears at node 38, at each positive peak of the DC restored signal, the capacitor 54 charges up to a potential that is substantially equal to the peak of such signal assuming the signal peak amplitude is greater than that presently stored on capacitor 54 (differing by the voltage drop produced across the diode 50). Between peaks, some of the charge on capacitor 54 leaks off through the resistor 56, to be replenished by an appropriate new charge at the occurrence of the next peak. Accordingly, the voltage developed across the capacitor 54 is generally a reproduction of the peaks of the modulation envelope of the applied DC stored signal.

It should be noted that the time constant of the capacitor 54 and the resistor 56 if selected to be small enough so that during modulation cycles when the envelope is decreasing in amplitude because of a decrease in contrast, the voltage across the capacitor 54 is allowed to decrease as the envelope diminishes in amplitude.

An operational amplifier 60 having a high input impedance has its noninverting terminal connected to the node 52 and its output 62 connected to its inverting terminal 64. A positive source of potential is applied at 65 and a negative source of potential is applied at 66. The amplifier 60 is similar in construction to the amplifier 22 and serves to conduct the peak detected signal applied at node 52 to its output 62 while isolating the elements comprising the peak detector from impedance variations and loading effects caused by the comparator 16 such as may be caused by chatter, etc. In the preferred embodiment, the amplifier 60 is one manufactured by the Harris Corporation and designated by them as model HA-2655.

A potentiometer 67 having a wiper 68 is connected between output 62 and ground 40 and serves as a voltage divider or threshold setting potentiometer. In the preferred embodiment, the wiper 68 is adjusted so as to be located at a position to provide a voltage that is about 50 percent of that developed between output 62 and ground 40.

The comparator 16 is a high input impedance unit and includes an inverting input 70 connected to the wiper 68, a non-inverting input 72 connected to the node 38 and an output 74. The comparator 16 develops a low output when the magnitude of the peak detected signal applied to input 70 is greater than the reference DC restored potential applied to its input 72, and changes state or generates an output having a high value on output 74 when the DC restored signal is greater than the peak detected signal applied to the input 70.

In the preferred embodiment, the comparator 16 is one manufactured by the Harris Corporation and designated by them as the model HA-2311.

The flip-flop 18 includes an input 76 connected via conductor 78 to the output 74, a clock input 80 connected to the output 84 of the timing generator 20 via conductor 86 and an output 88. The output 88 of the flip-flop 18 is normally in the low state. The flip-flop 18 is responsive to a positive level applied at its input 76 and in response to the leading edge of a clocking pulse applied to its input 80 is operative to switch the state of the signal appearing on its output 88. As will be subsequently described, the signal appearing on its output 88 is a bistate signal corresponding to a digital representation of the black marks on the white surface that is being scanned.

The timing generator 20 having outputs 44 and 84 includes those power supply and integrated circuit components required to provide a bistate signal having a high level of approximately 5 volts on output 44 and to provide a pulse train, or clock signal, having a constant repetition rate on output 84.

Figure 2:
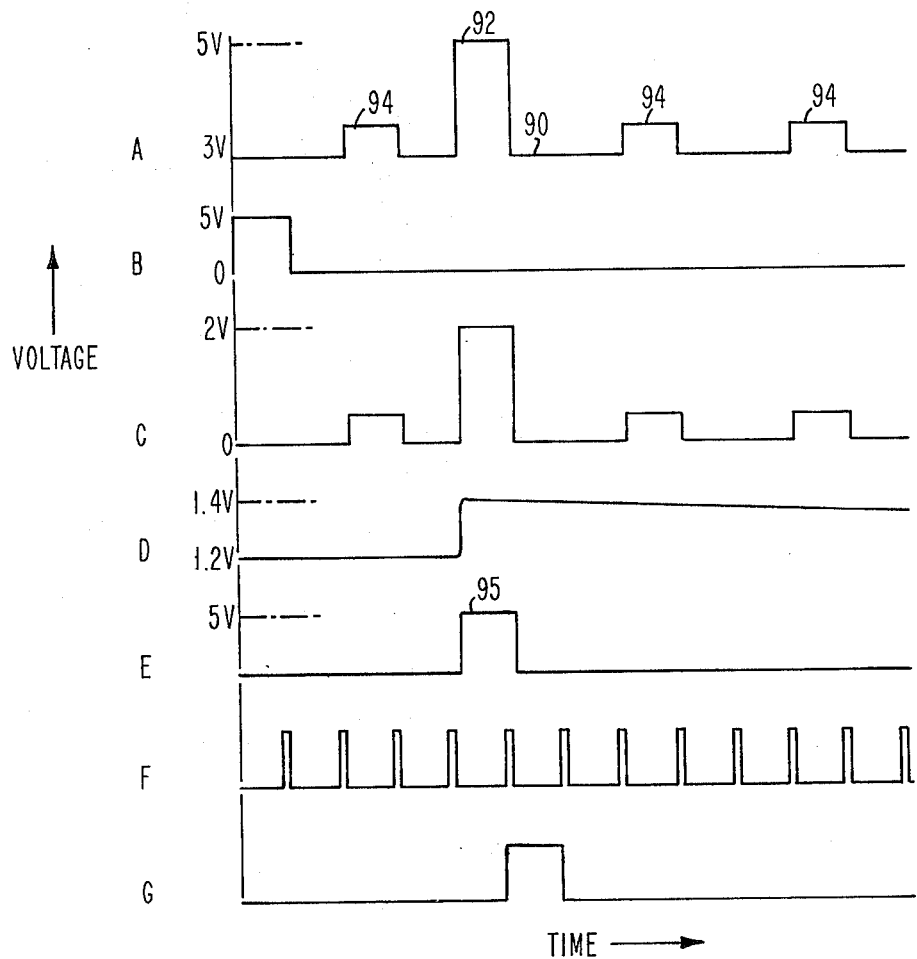

Referring to FIG. 2, the waveforms of the signals encountered at various points in the threshold detector 10 of the present invention are illustrated. FIG. 2A represents the waveform of the analog video signal provided at the input 30 of the amplifier 22. As illustrated the signal includes a low level 90 corresponding to the reflectance off the generally white paper being scanned and higher levels corresponding to black marks or to false indications of black marks on the paper. The low state corresponds to a voltage level of about 3 volts and a true black mark 92 corresponds to a signal having a voltage level of about 5 volts. As will be subsequently described, pulses 94 having an intermediate voltage level, such as 3.5 volts, are determined to be false indications of black marks. FIG. 2B illustrates the output of the timing generator 20 that is applied to the base of the clamping transistor 26. FIG. 2C represents the signal appearing at the collector of the clamping transistor and at node 38 and corresponds to a DC restored signal with a zero volt reference level. FIG. 2D represents the signal developed at node 52 across the capacitor 54. As illustrated, such signal includes a transition from 1.2 volts to 1.4 volts at a time corresponding to the leading edge of the pulse 92. FIG. 2E represents the signal developed at output 74 of the comparator 16 and includes a pulse 95 when the DC restored signal is greater than the level of the peak detected signal applied to the input 70. FIG. 2F represents the waveform of the pulse train provided by the timing generator 20 on conductor 86. As illustrated, the leading edge of one of the pulses occurs at a time prior to that when the output of comparator 16 rises and a successive pulse has a leading edge that occurs when such output is high and that serves to strobe the flip-flop 18. FIG. 2G represents the bistate signal appearing on the output 88 of the flip-flop 18.

In operation, with the amplifiers 22 and 60 properly biased, a wand (not shown) including a light source and a charge injected device (CID) array is placed over the generally white surface of the tag, label, etc., with the characters that are desired to be recognized. Typically, the array includes 40 photocells in each column. The photocells and optics are oriented such that when the location of the photocell is imaged onto the tag the corresponding photoreceptive spacing is approximately 0.005 inches. The wand is then placed correctly on the printed label and scanned at a scanning rate such that one of the photoreceptive locations is interrogated approximately every 3.3 microseconds.

In a manner well known in the art, the CID array develops and provides at input 30 the analog video signal shown in FIG. 2A. In the preferred embodiment, the video signal has a rate of 300,000 samples per second and a reference level 90 of about 3 volts with pulses having a magnitude of up to an additional 2 volts superimposed on the reference level.

It should be noted that the magnitude of reference level depends upon the reflectivity of the paper being scanned and the optical detection system. Consequently, in some low contrast embodiments, the reference level has been found to be about 1.5 volts and pulses corresponding to true black marks to have a voltage difference of about 0.5 volts.

The analog signal is amplified by the amplifier 22 and applied to the capacitor 24 which removes the DC component from the amplified signal. The timing generator 20 applies the pulse shown in FIG. 2B to the base of the clamping transistor 26, causing the transistor to conduct for a time corresponding to that when the first cell is sampled for each vertical scan line of the tag. This clamps node 38 to a zero volt reference level. When the pulse is removed, the charge built up across the capacitor 24 subtracts from the signal at output 32 to provide the DC restored signal shown in FIG. 2C at node 38, and hence, at the resistor 48 in the peak detector 14 and at the noninverting input 72.

Since the "white" level of the tag is generally uniform, such level remains at 0 volts for the duration of the time required to scan a row of the detectors. When a black mark on the tag is detected the restored signal goes positive by an amount corresponding to the quality of the blackness. It should be recognized that such clamping effectively removes signal variations due to the reflectivity of the tag.

It is assumed that the first cell that is sampled corresponds to a "white" level for purposes of this explanation. Should this not be the case and a "black" level be detected, the OCR wand has been incorrectly aligned and correct reading could not occur and proper alignment must occur before proceeding.

The portion of the DC restored signal that is applied to the peak detector 14 causes the peak signal, illustrated in FIG. 2D and corresponding to the black peaks, to be developed across capacitor 54. Short duration noise spikes and high contrast signals are suppressed from being applied to the amplifier 60 because of the selected time constant associated with the filter circuit comprising resistor 48 and capacitor 54. The resistor 56 provides a discharge path for the potential across capacitor 54. This enables the circuit to respond to tags of widely different contrast ratios and avoids a long duration delay normally associated with the decay of a voltage developed across a capacitor. Accordingly, the peak black level of the video signal is tracked and produced at the output 62 of the operational amplifier 60.

The peak detected signal is applied to the potentiometer 67 which divides the signal and provides a predetermined reference voltage level on wiper 68 and hence, at the inverting terminal 70 of the comparator 16, such level having a magnitude that is greater than that of the false pulses 94.

In the preferred embodiment, the wiper 68 is adjusted so that about 50 percent of the peak detected signal is applied to the inverting terminal 70. Thus, false pulses are not detected.

With the DC restored signal of FIG. 2C and the divided peak detected signal, similar to that of FIG. 2D, applied to the input terminals 70 and 72, the comparator 16 provides the bistate signal shown in FIG. 2E on output 74. Such signal has normally low state and a high state 95 when the DC restored signal is greater than the peak detected signal.

With the bistate signal of FIG. 2E and the clock signal of FIG. 2F applied to the flip-flop 18, the flip-flop 18 is clocked by the leading edges of the clock pulses, samples the level of the bistate signal at that time and produces the bistate signal as illustrated in FIG. 2G on its output 88. The signal of FIG. 2G includes a positive going transition at a time corresponding to a leading edge of the pulse of FIG. 2F, a negative going transition at the next leading edge, and has a level equal to the level of the bistate signal of FIG. 2E between the transitions. Since waveform 2E remains low when the false pulse occurs, the state of the flip-flop is not changed due to their occurrence. Also, because strobing occurs after pulse 95 has settled and just prior to the time it goes low, the problems associated with comparator chatter are omitted.

Therefore, the threshold detector circuit 10 has operated to preclude the interpretation of false pulses caused by ink smears and the like, and transmits on its output terminal only the bistate digital signal corresponding to black marks that actually are written on the white tag.

In an alternative embodiment, a high impedance amplifier (not shown) is connected in the peak detector circuit before the resistor 48 to prevent loading and hence discharging the capacitor 24. The amplifier can be similar to the amplifier 22.

While the invention has been particularly shown and described with reference to a certain preferred embodiment, it will be understood by those skilled in the art that various alterations and modifications in form and detail may be made therein. Accordingly, it is intended that the following claims cover all such alterations and modifications as fall within the true spirit and scope of the invention.

What is claimed is:

1. A threshold detector for use with a video signal including a first level representative of a white surface, a second level representative of a true black mark on the white surface, and a third level intermediate said first and second levels representative of a false black mark, said threshold detector comprising:

first means responsive to a video signal and operative to clamp such signal so as to provide a restored signal that is a replica of said video signal and having a base level corresponding to said first level, a fourth level corresponding to said second level and a fifth level corresponding to said third level;

second means responsive to said restored signal and operative to provide a peak detected signal having a magnitude that corresponds generally to said fourth level;

third means for reducing the magnitude of said peak detected signal such that the reduced signal exceeds said fifth level;

a comparator device responsive to said restored signal and the reduced peak detected signal and operative to produce a first bistate signal having a normally low level and having a high level when said restored signal exceeds said reduced peak detected signal;

fifth means for generating a sequence of pulses, one of which occurs when said first bistate signal has said high level; and a flip-flop device having a first input connected to said comparator, a second input connected to said fifth means, and an output, said flip-flop device being responsive to said first bistate signal and said sequence of pulses and operative to provide, at said flip-flop device output, a second bistate signal having a first state and a second state, and having a transition from said first state to said second state when there is time coincidence between said high level and one of said sequence of pulses, and having a transition from said second state to said first state upon the occurrence of a pulse next in time to said one of said pulses, said second state corresponding to the occurrence of a true black mark.

2. A threshold detector as recited in claim 1 wherein said first means comprises seventh means for removing the DC component from said video signal, and eighth means coupled to said seventh means for applying a first potential corresponding to said base level to the video signal.

3. A threshold detector as recited in claim 2 wherein said seventh means comprises a capacitor and said eighth means comprises a first source of said first potential, a second source for selectively supplying a second potential, and a transistor having a collector coupled to said capacitor, an emitter connected to said first source, and a base connected to said second source, said second potential serving to cause said transistor to conduct such that said base level is applied to said capacitor.

4. A threshold detector as recited in claim 1 and further comprising ninth means for isolating said first means from impedance variations that occur in devices that supply said video signal.

5. A threshold detector as recited in claim 1 wherein said second means comprises teeth means for discharging said peak detected signal.

6. A threshold detector as recited in claim 1 wherein said second means includes an operational amplifier for isolating said third means from impedance variations of said first means.

7. A threshold detector as recited in claim 1 wherein said third means comprises a voltage divider circuit.

8. A threshold detector as recited in claim 7 wherein said voltage divider circuit serves to reduce the magnitude of said peak detected signal to a level that is about one-half that of said fourth level.

* * * * *